(12) United States Patent
Myer

(10) Patent No.: US 12,017,766 B2
(45) Date of Patent: Jun. 25, 2024

(54) FLYING CAR

(71) Applicant: Jimmy Sherwood Myer, Topeka, KS (US)

(72) Inventor: Jimmy Sherwood Myer, Topeka, KS (US)

( * ) Notice: Subject to any disclaimer, the term of this patent is extended or adjusted under 35 U.S.C. 154(b) by 43 days.

(21) Appl. No.: 17/829,822

(22) Filed: Jun. 1, 2022

(65) Prior Publication Data
US 2023/0115625 A1 Apr. 13, 2023

Related U.S. Application Data

(60) Provisional application No. 63/254,879, filed on Oct. 12, 2021.

(51) Int. Cl.
*B64C 37/00* (2006.01)
*B60F 5/02* (2006.01)
*B64C 29/00* (2006.01)

(52) U.S. Cl.
CPC ............... *B64C 37/00* (2013.01); *B60F 5/02* (2013.01); *B64C 29/0083* (2013.01)

(58) Field of Classification Search
CPC ........ B64C 37/00; B64C 29/0083; B60F 5/02
See application file for complete search history.

(56) References Cited

U.S. PATENT DOCUMENTS

| | | | | |
|---|---|---|---|---|
| 6,340,133 B1 * | 1/2002 | Capanna | ............. | B64C 29/0083 244/6 |
| 8,794,566 B2 * | 8/2014 | Hutson | ................ | B64C 27/006 244/50 |
| 11,117,658 B2 * | 9/2021 | Neff | ......................... | B64C 27/08 |
| 2007/0173173 A1 * | 7/2007 | Suzuki | .................... | A63H 17/00 446/431 |
| 2018/0354607 A1 * | 12/2018 | Marot | ................. | B64C 29/0033 |
| 2020/0023701 A1 * | 1/2020 | Salem | ........................ | B60F 5/02 |
| 2020/0172234 A1 * | 6/2020 | Neff | ..................... | B64C 29/0033 |
| 2021/0031913 A1 * | 2/2021 | Martel | .................... | B64D 17/80 |
| 2021/0387739 A1 * | 12/2021 | Neff | ........................ | B64C 25/405 |
| 2023/0012160 A1 * | 1/2023 | Opalinski | ............... | B64C 37/00 |

FOREIGN PATENT DOCUMENTS

| | | | | |
|---|---|---|---|---|
| CN | 109353176 A | * | 2/2019 | |
| CN | 109367337 A | * | 2/2019 | ............... B60F 5/02 |
| CN | 109455051 A | * | 3/2019 | ............... B60F 5/02 |
| DE | 102019001130 B3 | * | 2/2020 | |
| GB | 2577749 A | * | 4/2020 | ............... B60V 1/11 |
| WO | WO-2021117054 A1 | * | 6/2021 | |
| WO | WO-2023017407 A1 | * | 2/2023 | |

* cited by examiner

*Primary Examiner* — Joseph W Sanderson
(74) *Attorney, Agent, or Firm* — Barry Choobin; Patent 360

(57) ABSTRACT

A flying car that does not require complex transformation between a car and an aircraft, the flying car can quickly take off from a land, such as road or parking, and can land on the road or parking. The flying car is of triangular shape having a broad front and narrow rear. Three motorized members are coupled to three corners of a frame of the flying car. Each of the three motorized members includes a wheel assembly that includes a wheel and a wheel frame, an inner ring and an outer ring coupled to each other, and both mounted to the wheel frame. A fan mounted on the inner ring and one or more turbines mounted on the outer ring.

19 Claims, 4 Drawing Sheets

FLYING CAR

CROSS-REFERENCE TO RELATED APPLICATIONS

This application claims priority from a U.S. Provisional Patent Appl. No. 63/254,879 filed on Oct. 12, 2021, which is incorporated herein by reference in its entirety.

FIELD OF INVENTION

The present invention relates to the flying car, and more particularly, the present invention relates to the flying car that can readily fly like an aircraft and can take off from a limited space.

BACKGROUND

A flying car, also known as a roadable aircraft, is a type of vehicle that can serve the dual function of a car and an aircraft. The flying car can transform between a personal car and an aircraft. A flying car offers several advantages, such that a person using a flying car can ride and fly to a destination that does not have direct road connectivity. A person can ride the vehicle as a car where the road is available and fly like an aircraft where no road is there. The combination of driving on road and flying can save a massive amount of fuel in comparison to directly flying to the destination.

As of now, the flying cars are mostly in the development stages and very limited options are commercially available. The future of flying cars looks very promising, and flying cars are likely to saturate the markets by the next decade. Flying cars have several advantages, however, the known flying car models suffer from several limitations. The major limitation is the transformation of the flying car between the car and the aircraft is complex and time-consuming. Typically, the driver has to drive the flying car to an airport where the flying car is unfolded and folded to transform into the aircraft. A similar procedure is required for transforming the aircraft into a car. Another drawback of known flying car models is the maneuverability of the flying car is complex and difficult. Helicopter-like flying car models are also known, however, maneuverability is a major issue with helicopter-like flying car models besides excessive fuel consumptions in the take-offs.

Thus, a need is appreciated for a novel flying car that overcomes the aforesaid limitations and drawbacks in the known flying car models but has all the advantages.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a flying car that can vertically take off from a limited space.

It is another object of the present invention that the flying car is easy to maneuver and drive.

It is still another object of the present invention that the flying car can take off from a road while being stuck in a traffic standstill.

It is a further object of the present invention that the flying car is safe to drive and fly.

It is yet another object of the present invention that the flying car can hover like a helicopter.

It is still a further object of the present invention that the flying car can quickly take off.

It is yet a further object of the present invention that the flying car can fly at high speeds.

It is an additional object of the present invention that the flying car can land on the road or in a parking lot.

It is still an additional object of the present invention that the flying car can be used as an emergency first response vehicle for hard-to-reach areas.

In one aspect, disclosed is a flying car that includes a frame that has a left front attachment, a right front attachment, and a rear attachment; three motorized members coupled to the left front attachment, the right front attachment, and the rear attachment, wherein each motorized member of the three motorized members comprises: a wheel assembly, the wheel assembly comprises a wheel frame and a wheel, the wheel assembly configured to move the flying car on land; an inner ring and an outer ring mounted to the wheel frame of the wheel assembly, the inner ring coupled to the outer ring; and a fan mounted to the inner ring.

In one implementation, the frame is triangular that has a broad front and a narrower rear side. The flying car further comprises a control unit, wherein the control unit is operably coupled to the three motorized members. The flying car further comprises a joystick operably coupled to the control unit, the joystick configured to be actuated for maneuvering, driving, and flying the flying car. Each motorized member further comprises one or more turbines to generate a thrust for lifting and landing of the flying car. The one or more turbines are mounted to the respective outer ring. The flying car further comprises a plurality of control buttons, the plurality of control buttons comprises a first button to throttle up the one or more turbines, and a pair of buttons to instruct the control unit to lift and land the flying car. Each motorized member is coupled through a bracket to the respective attachment of the left front attachment, the right front attachment, and the rear attachment. The rear attachment and the respective bracket are coupled using a hinge joint, wherein the motorized member coupled to the rear attachment pivots horizontally. The wheel assembly further comprises a hubless motor for driving the wheel. The flying car further comprises a battery and an electric motor, the electric motor configured to drive the three motorized members. The inner ring and the fan are configured to lift and propel the flying car as an aircraft. The one or more turbines comprises four turbines. The inner ring and the outer ring of each motorized member of the three motorized members are configured to move independently and relative to each other to change orientation of the respective fan and the one or more turbines. The control unit is configured to coordinate the movement of the inner ring and the outer ring of the three motorized members.

BRIEF DESCRIPTION OF THE DRAWINGS

The accompanying figures, which are incorporated herein, form part of the specification and illustrate embodiments of the present invention. Together with the descrip

DETAILED DESCRIPTION

Figure 1:
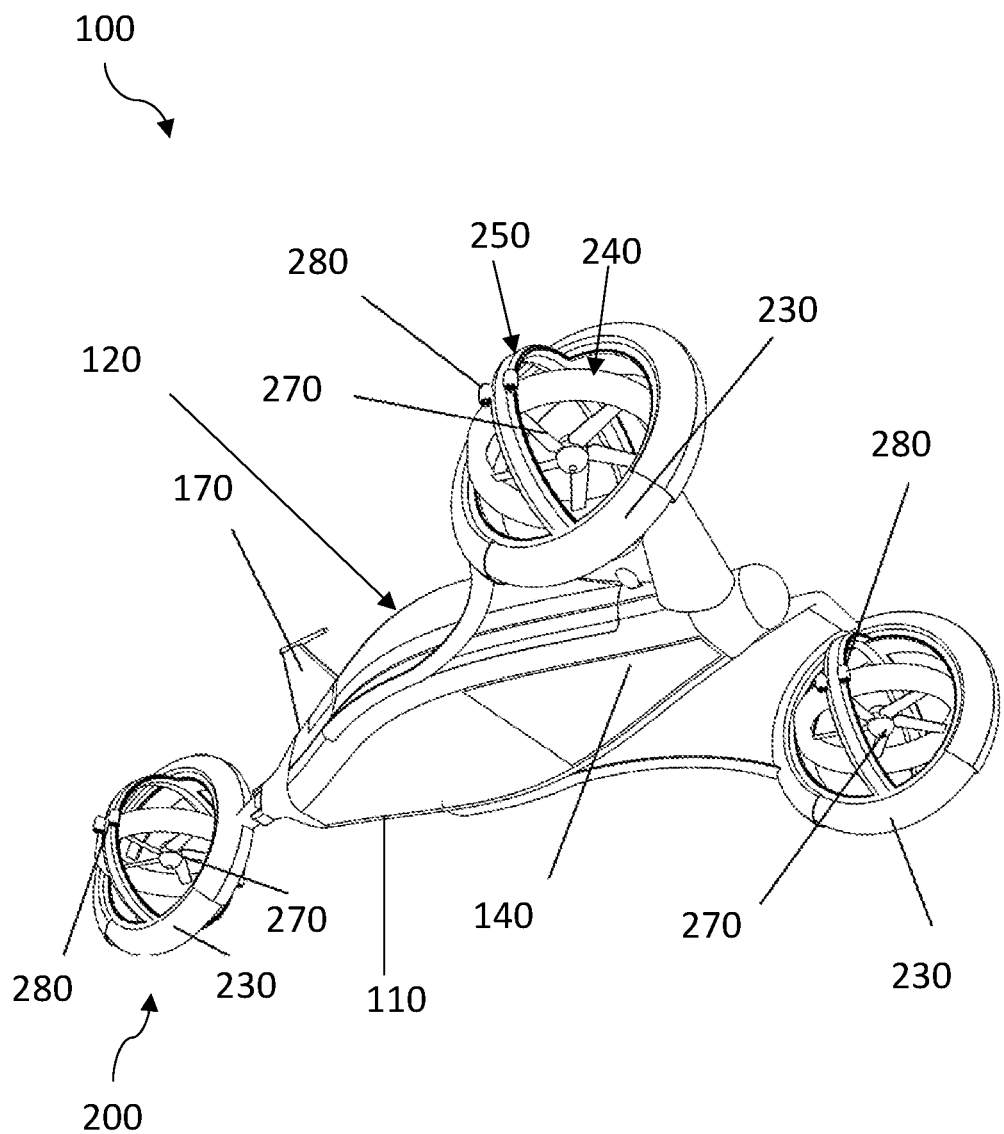
- FIG. 1 is a perspective view of the flying car, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Disclosed is a flying car that can transform between a car and an aircraft. The transformed car can be driven like any regular car with good speeds and stability. The flying car as the aircraft can quickly take off to fly like a typical jet with high speeds and control. The key advantage of the disclosed flying car is to readily take off from the ground and land on the ground without needing a complex transformation. The flying car can take off from the road while being stuck in standstill traffic and fly to the destination. Similarly, the flying car as the aircraft can land on the road or a parking lot and then could be driven to the destination. The disclosed flying car may not need a complex transformation that requires a lot of space and time, but the flying car can readily fly, land, and driven. The disclosed flying car can hover like a helicopter and can easily maneuvered.

Figure 2:
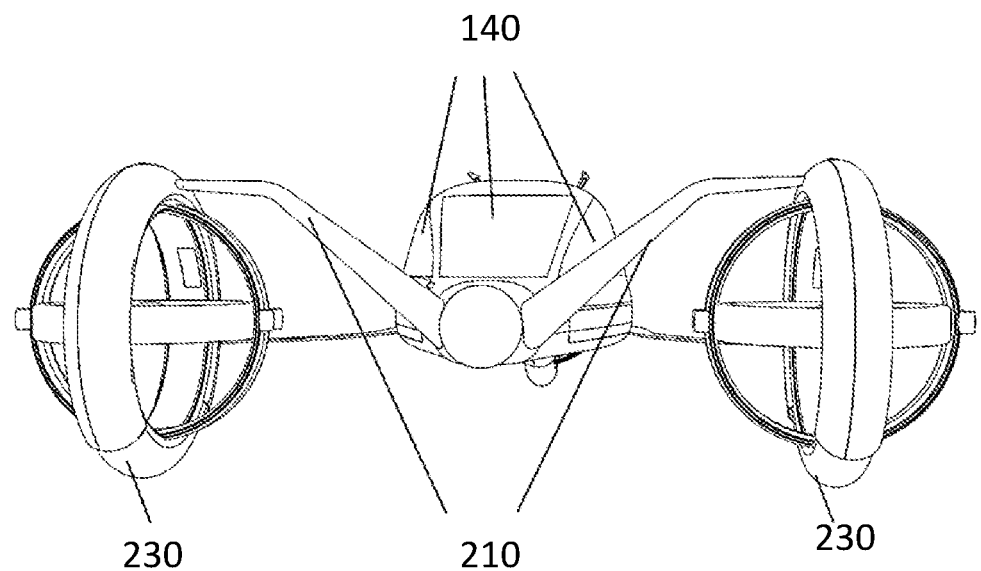
FIG. 2 is a front view of the flying car, according to an exemplary embodiment of the present invention.
Figure 3:
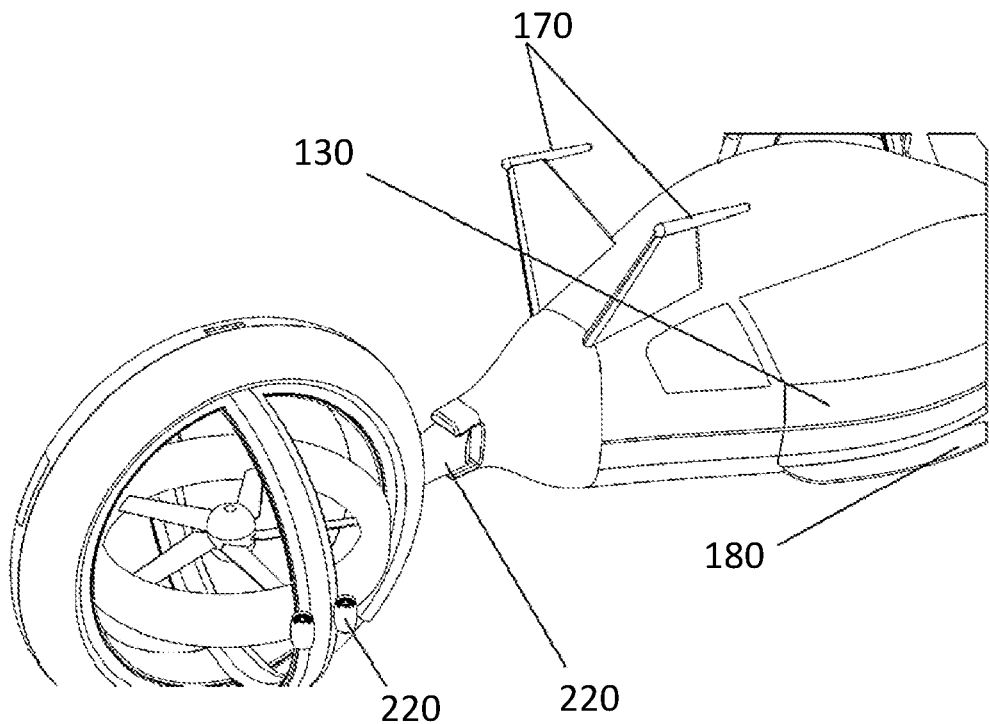
FIG. 3 is an enlarged view of a rear portion showing a hinge joint, according to an exemplary embodiment of the present invention.
Figure 4:
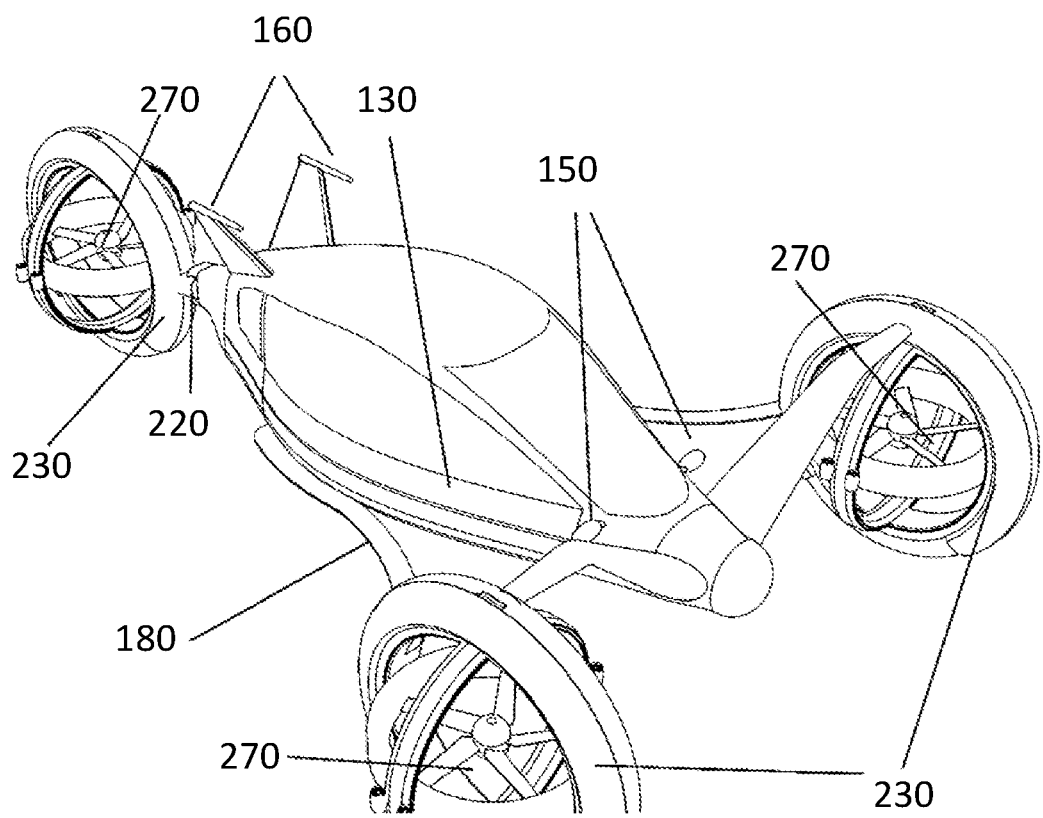
FIG. 4 is a top and front perspective view of the flying car, according to an exemplary embodiment of the present invention.

Referring to FIGS. 1-4 which show an exemplary embodiment of a flying car 100, FIG. 1 shows a bottom and front perspective view of the disclosed flying car, FIG. 2 shows a front view of the flying car, FIG. 3 shows a rear view of the flying car, and FIG. 4 shows the front and side perspective view of the flying car. The disclosed flying car can have a tricycle-like frame 110 that includes a broad front and a pointed rear end. To the frame can be mounted a body 120 of the vehicle. The body of the vehicle can have one or more doors 130 for gaining entry into the flying car. Suitable seats can also be mounted to the frame and within the body for allowing people to sit in the flying car. The front seat can be a driver's seat while the passengers can sit in the rear seats. The rear seat can however be optional, and the disclosed flying car can only have a single seat for the driver. The flying car can have other accessories commonly used in passenger cars, such as an air conditioning system, entertainment system, lights, and the like. The height of the flying car, as shown in FIG. 1, can be similar to any passenger car such that a driver or a passenger can easily enter and exit the flying car without needing stairs or climbing a height. The body of the flying car can be provided with a front windshield and windows. Windows 140 can be provided on the sides, bottom, and top of the flying car so to provide a good view of the outside from within the flying car. A bottom window made of glass can be seen in FIG. 1. FIG. 2 shows the front windshield and side windows. The front windshield and side windows can also be seen in FIG. 4. Two rearview mirrors 150 are also shown in FIG. 4 which are similar to rearview mirrors in a motorable vehicle. FIG. 4 also shows two antennas that can be used for connecting to an external network for radio connection, a cellular connection, the internet, and the like.

The frame 110 can be substantially triangular with a broad front and a narrow rear. The frame can have three corners, two corners on the front side and a single corner on the rear side. Two motorized members 200 can be coupled to two corners on the front side and a single motorized member 200 can be coupled to the rear corner of the frame. The motorized members can be coupled through elongated brackets 210 or shafts. The brackets may allow adjusting the heights of the motorized members. The bracket on the rear side of the flying vehicle can be pivotally coupled to the frame using a hinge joint 220, such that the rear motorized member can pivot horizontally relative to the frame. An additional bracket 180 connecting the frame to the two rear motorized members can act as a step to climb in the flying car.

Each motorized member can include an outer wheel assembly 230 for driving the flying vehicle on road. The wheel assembly can include an outer wheel hubless motor and an electrically powered wheel. The outer wheel hubless motor is known in the art and any modification to the outer wheel hubless motor is within the scope of the present invention. The disclosed flying vehicle can be pure electric, hybrid, or pure fuel-based, and accordingly have a suitable engine and/or motor for powering the flying vehicle.

The disclosed motorized member can further include two motorized rings i.e., an inner ring 240 and an outer ring 250, both joined together and mounted to a wheel frame of the wheel assembly. The inner ring mounts a fan 270 to lift and propel the flying car as an aircraft. Each motorized member 200 can further include multiple turbines 280 to generate a thrust for lifting and landing of the vehicle. The drawings show each motorized member having four mini turbines on the outer ring, however, the number of turbines may vary and are within the scope of the present invention. The inner ring and the outer ring can be moved independently and relative to each other to change the orientation of the fans and mini turbines that allows the flying car to take off and fly and land. The coordinated movement of the inner ring, the fan mounted to the inner ring, and the outer ring allows for smooth and easy maneuverability of the flying car. FIG. 1 also shows a wing 170 of the pair of wings on both sides of the body.

The operation of the three motorized members 200 including the orientation of the fans and mini turbines on the three motorized members can be independently controlled. However, to make the operation of the flying vehicle easier, a control unit can synchronize and operate the three motorized members based on instructions from a joystick. A single joystick can be provided, and the driver can control and drive the flying car on road and in the air using the joystick. Few easy-to-use controls can be provided on the joystick or within reach of the driver. For example, a red button on the joystick can be pressed to throttle up the mini turbines to increase speed. A pair of buttons can be provided to instruct the flying vehicle to lift and land.

The disclosed flying vehicles can use propulsion fans not only for flying but also while running on the road. For example, the fans can be used for sharp acceleration and deacceleration of the vehicle. The turbines can also be used to generate energy from the fuel of the flying car which may otherwise go waste.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A flying car comprises:
   a frame that has a left front attachment, a right front attachment, and a rear attachment;
   three motorized members coupled to each of the left front attachment, the right front attachment, and the rear attachment respectively, wherein each motorized member of the three motorized members comprises:
   a wheel assembly, the wheel assembly comprises a wheel frame and a wheel, the wheel assembly configured to move the flying car on land;
   an inner ring and an outer ring mounted to the wheel frame of the wheel assembly, the inner ring coupled to the outer ring;
   a fan mounted to the inner ring; and
   one or more turbines to generate a thrust for lifting and landing of the flying car.

2. The flying car according to claim 1, wherein the frame is triangular in shape that has a broad front and a narrower rear side.

3. The flying car according to claim 1, wherein the flying car further comprises a control unit, wherein the control unit is operably coupled to the three motorized members.

4. The flying car according to claim 3, wherein the flying car further comprises a joystick operably coupled to the control unit, the joystick configured to be actuated for maneuvering, driving, and flying the flying car.

5. The flying car according to claim 1, wherein the one or more turbines are mounted to a respective outer ring.

6. The flying car according to claim 1, wherein the flying car further comprises a plurality of control buttons, the plurality of control buttons comprises a first button to throttle up the one or more turbines, and a pair of buttons to instruct the control unit to lift and land the flying car.

7. The flying car according to claim 1, wherein each motorized member is coupled through a bracket to the respective attachment of the left front attachment, the right front attachment, and the rear attachment.

8. The flying car according to claim 7, wherein the rear attachment and the respective bracket are coupled using a hinge joint, wherein the motorized member coupled to the rear attachment pivots horizontally.

9. The flying car according to claim 1, wherein the wheel assembly further comprises a hubless motor for driving the wheel.

10. The flying car according to claim 1, wherein the flying car further comprises a battery and an electric motor, the electric motor configured to drive the three motorized members.

11. The flying car according to claim 1, wherein the inner ring and the fan are configured to lift and propel the flying car as an aircraft.

12. The flying car according to claim 1, wherein the inner ring and the outer ring of each motorized member of the three motorized members are configured to move independently and relative to each other to change orientation of the respective fan and the one or more turbines.

13. The flying car according to claim 12, wherein the control unit is configured to coordinate movement of the inner ring and the outer ring of the three motorized members.

14. A flying car comprises:
    a frame comprising at least a left attachment and a right attachment;
    two motorized members, wherein the at least two motorized members comprises a left motorized member and a right motorized member, wherein the left motorized member is coupled to the left attachment and the right motorized member is coupled to the right attachment, wherein each motorized member of the at least two motorized members comprises:
    a wheel assembly, the wheel assembly comprises a wheel frame and a wheel, the wheel assembly configured to move the flying car on land;
    an inner ring and an outer ring mounted to the wheel frame of the wheel assembly, the inner ring coupled to the outer ring, wherein the inner ring and the outer ring are configured to move independently and relative to each other;
    a fan mounted to the inner ring; and
    one or more turbines to generate a thrust for lifting and landing of the flying car.

15. The flying car according to claim 14, wherein the one or more turbines are mounted to a respective outer ring.

16. The flying car according to claim 15, wherein the inner ring and the outer ring are configured to move to change orientation of the respective fan and the one or more turbines trough a control unit.

17. A flying car comprises:
- a frame comprising at least a left attachment and a right attachment;
- at least two motorized members, wherein the at least two motorized members comprises a left motorized member and a right motorized member, wherein the left motorized member is coupled to the left attachment and the right motorized member is coupled to the right attachment, wherein each motorized member of the at least two motorized members comprises:
  - a wheel assembly, the wheel assembly comprises a wheel frame and a wheel, the wheel assembly configured to move the flying car on land;
  - an inner ring and an outer ring mounted to the wheel frame of the wheel assembly, the inner ring coupled to the outer ring;
  - one or more turbines to generate a thrust for lifting and landing of the flying car; and
  - a fan mounted to the inner ring.

18. The flying car according to claim 17, wherein the one or more turbines are mounted to a respective outer ring.

19. The flying car according to claim 18, wherein a control unit is configured to coordinate movement of the inner ring and the outer ring relative to each other and to the wheel frame.

* * * * *